United States Patent
Thompson et al.

(10) Patent No.: US 7,434,646 B2
(45) Date of Patent: Oct. 14, 2008

(54) ON-DEMAND FOUR WHEEL DRIVE SYSTEM

(75) Inventors: Mark E Thompson, Windsor (CA); Frank C Thompson, IV, Livonia, MI (US); Michael W Gapski, Eastpointe, MI (US)

(73) Assignee: Chrysler LLC, Auburn Hills, MI (US)

(*) Notice: Subject to any disclaimer, the term of this patent is extended or adjusted under 35 U.S.C. 154(b) by 237 days.

(21) Appl. No.: 11/300,892

(22) Filed: Dec. 15, 2005

(65) Prior Publication Data
US 2007/0151790 A1    Jul. 5, 2007

(51) Int. Cl.
*B60K 17/344* (2006.01)
*G06F 17/00* (2006.01)

(52) U.S. Cl. .................................. 180/248; 701/69
(58) Field of Classification Search ............. 180/248, 180/233, 249, 250; 701/69, 89
See application file for complete search history.

(56) References Cited

U.S. PATENT DOCUMENTS

| | | | |
|---|---|---|---|
| 5,083,631 A | 1/1992 | Nakayama et al. | |
| 6,059,065 A * | 5/2000 | Takeda et al. | 180/244 |
| 6,487,486 B1 | 11/2002 | Anderson | |
| 6,498,975 B1 * | 12/2002 | Lee et al. | 701/69 |
| 6,882,922 B2 * | 4/2005 | Lee et al. | 701/89 |

* cited by examiner

*Primary Examiner*—Lesley D Morris
*Assistant Examiner*—Marc A Scharich
(74) *Attorney, Agent, or Firm*—Ralph E. Smith

(57) ABSTRACT

An on-demand four wheel drive system for a vehicle having a front drive train, a rear drive train, and a transfer case. The system includes a sensor system operable to detect the speed of the front drive train and the speed of the rear drive train. The system also includes a controller operable to cause the transfer case to supply input torque to the front drive train and the rear drive train when the sensor system detects that the speed of the rear drive train exceeds the speed of the front drive train by a predetermined amount. The controller is further operable to cause the transfer case to limit the amount of input torque supplied to the front drive train when the sensor system detects that the speed of the front drive train exceeds the speed of the rear drive train.

12 Claims, 2 Drawing Sheets

ON-DEMAND FOUR WHEEL DRIVE SYSTEM

FIELD OF THE INVENTION

The present invention relates to a four wheel drive system for a vehicle and, more particularly, relates to an on demand four wheel drive system.

BACKGROUND OF THE INVENTION

Many vehicles are equipped with four-wheel-drive systems. In some systems, generally referred to as on-demand 4-wheel drive systems, substantially all engine torque is supplied to a single axle during ordinary driving, and torque is transferred to the other axle when necessary. For instance, engine torque is supplied to the rear axle for ordinary driving, but when the rear wheels begin to slip on a low-traction surface, at least some of the engine torque can be supplied to the front axle to maintain vehicle stability.

When the vehicle turns, the front wheels move faster than the rear wheels. If torque is being split between the front and rear axles, the vehicle will resist turning, especially on concrete or other high-traction surfaces. Also, stress can be induced in the drive train and other components while turning.

Thus, four-wheel-drive systems were developed that allow engine torque to be distributed between the front and rear axles and yet allow for speed differences between the front and rear axles while the vehicle is turning. Active four-wheel-drive systems of this type rely on steering angle sensors to detect when the vehicle is turning. These steering angle sensors can be relatively expensive. In the absence of a steering angle sensor, these systems allow for large speed differences between the front and rear axle to allow vehicle turning. However, there is typically a significant delay before torque transfer, and transfer is abrupt and produces undesirable noise. Accordingly, there remains a need for a less expensive and smoother operating on-demand four wheel drive system.

SUMMARY OF THE INVENTION

Accordingly, an on-demand four wheel drive system for a vehicle is provided according to a first aspect of the present invention having a front drive train, a rear drive train, and a transfer case. The system includes a sensor system operable to detect the speed of the front drive train and the speed of the rear drive train. The system also includes a controller operable to cause the transfer case to supply input torque to the front drive train and the rear drive train when the sensor system detects that the speed of the rear drive train exceeds the speed of the front drive train by a predetermined amount. The controller is further operable to cause the transfer case to limit the amount of input torque supplied to the front drive train when the sensor system detects that the speed of the front drive train exceeds the speed of the rear drive train.

A second aspect of the present disclosure provides a method of operating a transfer case of a vehicle having a front drive train and a rear drive train. The method includes the steps of detecting the speed of the front drive train, detecting the speed of the rear drive train, and supplying input torque to the front drive train and the rear drive train when the detected speed of the rear drive train exceeds the detected speed of the front drive train by a predetermined amount. The method also includes the step of limiting the amount of input torque supplied to the front drive train when the speed of the front drive train exceeds the speed of the rear drive train.

According to a third aspect of the present invention, a vehicle is provided that includes an engine operable to supply input torque, a front drive train, a rear drive train, a sensor system operable to detect the speed of the front drive train and the speed of the rear drive train. The vehicle also includes a transfer case that supplies the input torque to the front drive train and the rear drive train when the sensor systems detects that the speed of the rear drive train exceeds the speed of the front drive train by a predetermined amount. The transfer case is further operable to limit the amount of input torque supplied to the front drive train when the sensor system detects that the speed of the front drive train exceeds the speed of the rear drive train.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
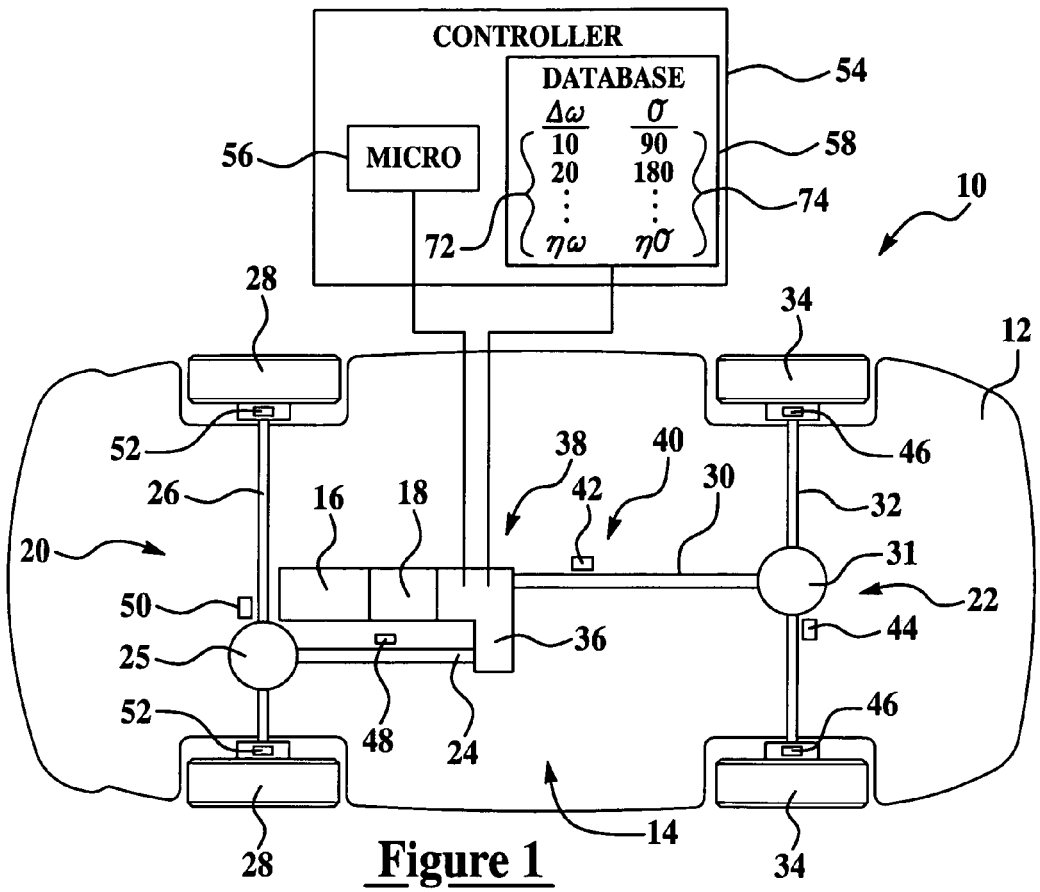
FIG. 1 is a top schematic view of a vehicle equipped with an on-demand four wheel drive system of the present invention.

Referring now to the figures and, in particular to FIG. 1, a vehicle 10 is illustrated. The vehicle 10 generally includes a vehicle body 12 and a power train system generally indicated at 14. The power train 14 includes an engine 16 and a transmission 18. The power train 14 also includes a front drive train generally included at 20 and a rear drive train generally included at 22. The front drive train 20 includes a front drive shaft 24, a front differential 25, a front axle 26, and a front set of tires 28. It will be appreciated that the front drive train 20 could include other suitable components, such as, but not limited to a front axle disconnect mechanism. The rear drive train 22 includes a rear drive shaft 30, a rear differential 31, a rear axle 32, and a rear set of tires 34. The power train 14 of the vehicle 10 also includes a transfer case 36. The transfer case 36 can be of any suitable type such as a clutch-type transfer case 36.

To propel the vehicle 10, the engine 16 generates an input torque that is altered by the gear sets of the transmission 18. Input torque from the transmission 18 is provided to the transfer case 36, which supplies input torque to one or both of the rear drive train 22 and the front drive train 20. For instance, under normal driving conditions, input torque supplied by the engine 16 will be passed through the transmission 18 and the transfer case 36. The transfer case 36 will, in turn, supply input torque to the rear drive shaft 30. The rear drive shaft 30 will supply input torque to the rear differential 31.

The rear differential 31 will supply input torque to the rear axle 32, and input torque will be supplied to the rear set of tires 34. Under some driving conditions that will be discussed in greater detail below, input torque will be supplied to both the front drive train 20 and the rear drive train 22. In other words, input torque will be supplied through the rear drive train 22 as described above. In addition, input torque will be supplied from the transfer case 36 to the front drive shaft 24. The front drive shaft 24 will supply input torque to the front differential 25. The front differential will supply input torque to the front axle 26, and the front axle 26 will supply input torque to the front tires 28. Thus, under certain driving conditions, torque will be supplied to both the front set of tires 28 and the rear set of tires 34 for added vehicle stability. Those having ordinary skill in the art will appreciate that the amount of input torque supplied by engine 16 will be altered by the gear sets of the transmission 18, by inertial losses in the power train system 14, and other factors. However, changes in the amount of input torque supplied by the engine will be generally disregarded except where noted for purposes of clarity.

As shown in FIG. 1, the vehicle 10 also includes an on-demand four wheel drive system generally indicated at 38. The on-demand four wheel drive system 38 generally controls whether the input torque supplied by the engine 16 is supplied to the rear drive train 22 only or whether the input torque is supplied to both the front and rear drive trains 20, 22.

The on-demand four wheel drive system 38 includes a sensor system generally indicated at 40. The sensor system 40 is operable to detect the speed of the front drive train 20 and the speed of the rear drive train 22. For instance, in the embodiment shown, the sensor system 40 includes a rear drive shaft speed sensor 42 that detects the rotational speed of the rear drive shaft 30. The sensor system 40 also includes a rear axle speed sensor 44, which detects the rotational speed of the rear axle 32. The sensor system 40 further includes a plurality of rear wheel speed sensors 46, which detect the rotational speed of the rear set of tires 34. Additionally, the sensor system 40 includes a front drive shaft speed sensor 48, which detects the rotational speed of the front drive shaft 24. Also, the sensor system 40 includes a front axle speed sensor 50, which is operable to detect the rotational speed of the front axle 26. The sensor system 40 further includes a plurality of front tire speed sensors 52, which detect the rotational speed of the front set of tires 28. Those having ordinary skill in the art will appreciate that the rotational speed of the rear drive train 22 could be detected individually by any of the rear speed sensors 42, 44, 46 or by a combination of the sensors 42, 44, 46. As such, the sensor system 40 could include just one or several of the rear speed sensors 42, 44, 46. Likewise, those having ordinary skill in the art will appreciate that the rotational speed of the front drive train 20 could be detected individually by any of the front speed sensors 48, 50, 52 or by a combination of the sensors 48, 50, 52. Thus, the sensor system 40 could include just one or several of the front speed sensors 48, 50, 52. The speed sensors 42, 44, 46, 48, 50, 52 could be of any known type for detecting rotational speed. It should also be appreciated that the sensor system 40 could be a dedicated system, or the sensor system 40 could be integrated with other systems including for instance an anti-lock braking system.

The on-demand four wheel drive system 38 further includes a controller 54. In the embodiment shown, the controller 54 includes a microprocessor 56 and a database 58. The database 58 includes front and rear drivetrain speed difference data 72 and steering angle data 74. The steering angle data 74 is correlated to the speed difference data 72. In one embodiment, the data 72, 74 is generated with a test vehicle by testing how much faster the front drive train 20 moves in comparison with the rear drive train 22 at a known steering angle. Further testing at different known steering angles will generate more data 72, 74 for the database. The controller 54 is in electrical communication with the speed sensors 42, 44, 46, 48, 50, 52 of the sensor system 40. As will be explained in greater detail below, the controller 54 is operable to cause the transfer case 36 to distribute the input torque between the front drive train 20 and the rear drive train 22 depending on the speeds of the front drive train 20 and rear drive train 22.

Figure 3:
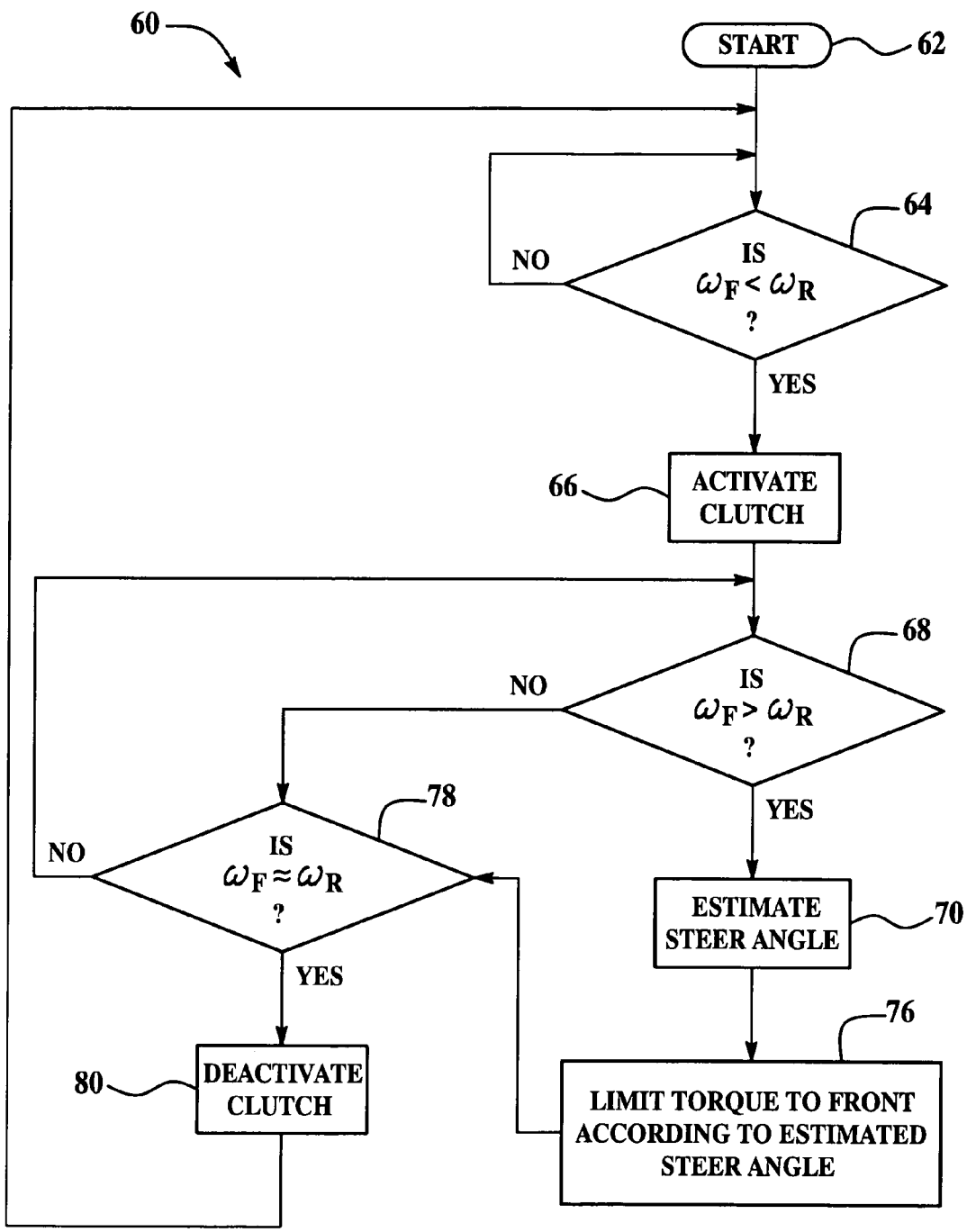
FIG. 3 is a flowchart representing one embodiment of a method of controlling a transfer case of the present invention.

Referring now to FIGS. 1 and 3, the operation of the on-demand four wheel drive system 38 will be discussed. The method 60 begins at start block 62. The start block 62 can represent a point at which the vehicle 10 begins to move. In one embodiment, substantially all input torque from the engine 16 is supplied to the rear drive train 22, and normal driving conditions are assumed. It will be understood that input torque could also be supplied to the front drive train 20 during normal drive conditions; however, the amount of input torque supplied to the front drive train 20 is negligible. Also, the sensor system 40 detects the speed of the front drive train 20 and the rear drive train 22.

In decision block 64, the speed of the front drive train 20 is compared with the speed of the rear drive train 22. The rotational speeds of the front drive train 20 will substantially match the rotational speed of the rear drive train 22 when the vehicle is driving straight on a high-traction surface. When the vehicle is turned, the rotational speed of the front drive train 20 will exceed the rotational speed of the rear drive train 22. As shown in FIG. 3, if the speed of the front drive train 20 matches the speed of the rear drive train 22 (straight high-traction driving) or if the rotational speed of the front drive train 20 exceeds the rotational speed of the rear drive train 22 (turning), decision block 64 will be answered in the negative and the method 60 will loop back to decision block 64. However, if the rear set of tires 34 begin to slip, such as on a low traction surface, the rotational speed of the rear drive train 22 will exceed the rotational speed of the front drive train 20, and decision block 64 will be answered in the affirmative. As a result, the clutch of the transfer case 36 will be activated in step 66. In one embodiment, the decision block 64 is answered in the affirmative only when the rotational speed of the rear drive train 22 exceeds the rotational speed of the front drive train 20 by a predetermined amount. For example, in one embodiment the clutch of the transfer case 36 is not activated until the speed of the rear drive train 22 exceeds the speed of the front drive train 20 by approximately ten (10) to twenty (20) revolutions per minute. It should be appreciated that the clutch of the transfer case 36 can be activated when the difference in speed between the front and rear drive train 20, 22 is relatively small, thereby allowing for a smoother and quieter activation of the clutch of the transfer case 36.

Once the clutch of the transfer case 36 is activated in step 66, input torque is divided between the front and rear drive train 20, 22. As such, the vehicle 10 can be driven with more stability.

The method 60 then continues to decision block 68 in which it is determined whether the vehicle is turning. In other words, it is determined whether the rotational speed of the front drive train 20 exceeds the rotational speed of the rear drive train 22.

Figure 2:
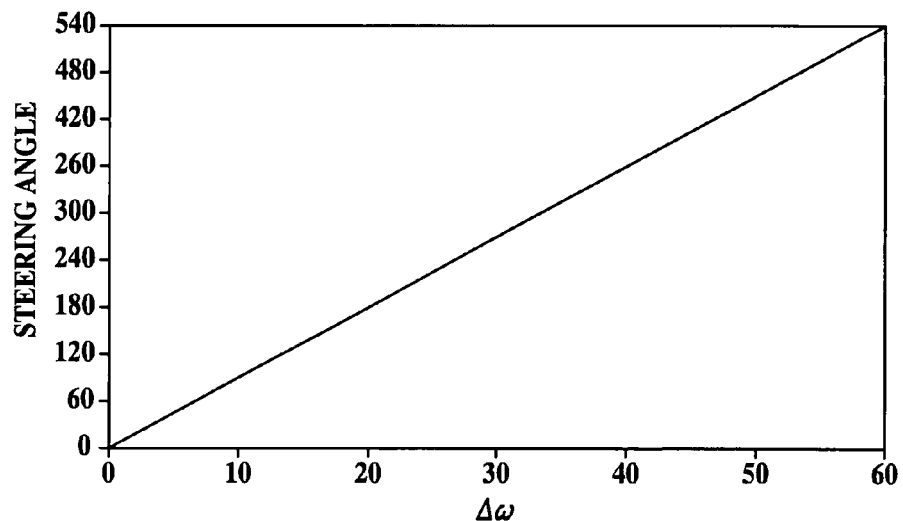
FIG. 2 is a graphical illustration of an exemplary functional relationship between drive train speed difference and steering angle that can be used by the on-demand four wheel drive system of the present invention.

If decision block 68 is answered in the negative, the method 60 moves to step 78, which is described below. If, however, decision block 68 is answered in the affirmative, the method 60 moves to step 70, in which the steering angle of the vehicle 10 is estimated. More specifically, the controller 54 estimates the steering angle of the vehicle 10 based on the difference in speed between the front and rear drive trains 20, 22. In one embodiment, the controller 54 accesses the database 58 (FIG. 1) to estimate the steering angle of the vehicle 10. More specifically, in one embodiment, step 70 involves comparing the difference in speed between the front and rear drive trains 20, 22 detected by the sensor system 40 to the speed difference data 72 in the database 58 to find the correlated steering angle in the database 58. In another embodiment, step 70 of the method 60 involves calculating the estimated steering angle using the microprocessor 56. For instance, as represented in FIG. 2, the difference in speed between the front and rear drive trains 20, 22 are correlated to an estimated steering angle in a linear function. The microprocessor 56 inputs the speed difference detected by the sensor system 40 into the function to calculate the estimated steering angle. Those having ordinary skill in the art will appreciate that the function utilized by the microprocessor 56 could be non-linear or a quadratic function without departing from the scope of the invention. It will also be appreciated that the four wheel drive system 38 could estimate the steering angle in step 70 either by accessing the database 58 or by calculating the steering angle with an appropriate function.

Referring back to FIG. 3, once the steering angle is estimated in step 70, the method 60 continues to step 76. In step 76, the amount of input torque supplied to the front drive train 20 is limited and reduced to thereby allow the vehicle to turn more easily and yet still maintain vehicle stability. The supplied input torque is limited to a predetermined amount depending on the estimated steering angle. In one embodiment, the amount of supplied input torque is directly proportional to the estimated steering angle, meaning that the greater the estimated steering angle, the less input torque is supplied. It should be appreciated that the input torque supplied to the front drive train 20 could be limited to approximately zero if the steering angle is extreme, for instance.

Next, the method 60 continues to decision block 78. As shown, when the speed of the front drive train is approximately equal to the speed of the rear drive train 22, the clutch of the transfer case 36 is deactivated in step 80, thereby supplying substantially all of the input torque back to the rear drive train 22. Once the clutch of the transfer case 36 is deactivated in step 80, the on-demand four wheel drive system 38 continues to monitor for slip on the rear set of tires 34 by returning to decision block 64. It should be appreciated that the method 60 could move from step 78 to step 80 when the speed of the rear drive train 22 is within a predetermined threshold of the speed of the front drive train 20.

Also as shown, if decision block 78 is answered in the negative (i.e., the speed difference between the front drive shaft and the rear drive shaft 20, 22 is not approximately equal) the clutch of the transfer case 36 remains activated. As a result, the on-demand four wheel drive system 38 continues to monitor for a vehicle turn by returning to decision block 68.

Furthermore, in one embodiment of the method 60, beginning at start block 62, the speed of the front and rear drive trains 20, 22 is detected and compared to each other. If the speed of the front drive train 20 exceeds the speed of the rear drive train 22, a vehicle turn is detected, and the steering angle is estimated as described above. Then, moving to decision block 64, if the speed of the rear drive train 22 exceeds that of the front drive train 20 (vehicle slipping), then transfer case 36 is activated in step 66. In step 66, assuming that the vehicle turn is still being detected, the controller 54 causes the transfer case 36 to limit the amount of input torque supplied to the front drive train 20. The amount of input torque is limited depending upon the current angle of the vehicle 10. Once the transfer case 36 is activated in step 66, the method continues to step 68 and to the subsequent steps as described above.

In summary, the on-demand four wheel drive system 38 of the present invention provides on-demand 4-wheel-drive capability for the vehicle 10 in an efficient and inexpensive manner. More specifically, the on-demand four wheel drive system 38 ordinarily supplies input torque from the transmission 18 to the rear drive train 22. When the rear set of tires 34 begin to slip, the transfer case 36 automatically supplies input torque to both the front and rear drive trains 20, 22 for added vehicle stability. Input torque is supplied to both the front and the rear drive trains 20, 22 until the speed of the front drive train 20 is approximately equal to the speed of the rear drive train 22. However, while torque is being supplied to both the front and rear drive trains 20, 22, the on-demand four wheel drive system 38 automatically detects whether the vehicle 10 is turning by detecting whether the front drive train 20 is moving faster than the rear drive train 22. If the vehicle turn is detected, the on-demand four wheel drive system 38 estimates the steering angle of the vehicle and limits the amount of input torque supplied to the front drive train 20 to thereby allow the vehicle to turn and yet still have sufficient driving stability. Advantageously, the on-demand four wheel drive system 38 is able to operate without the need of a steering angle sensor. As such, the on-demand four wheel drive system 38 is less expensive than those of the related art.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An on-demand four wheel drive system for a vehicle having a front drive train, a rear drive train, and a transfer case, the system comprising:

a sensor system operable to detect the speed of the front drive train and the speed of the rear drive train; and a controller operable to cause the transfer case to supply input torque to the front drive train and the rear drive train when the sensor system detects that the speed of the rear drive train exceeds the speed of the front drive train by a predetermined amount, the controller further operable to cause the transfer case to limit the amount of input torque supplied to the front drive train when the sensor system detects that the speed of the front drive train exceeds the speed of the rear drive train, the controller further operable to estimate a steering angle of the vehicle based on a difference in speed between the front drive train and the rear drive train detected by the sensor system, and wherein the controller is further operable to cause the transfer case to limit the amount of input torque supplied to the front drive train to a predetermined amount depending on the estimated steering angle.

2. The on-demand four wheel drive system of claim 1, wherein the controller is operable to cause the transfer case to supply substantially all input torque to the rear drive train until the sensor system detects that the speed of the rear drive train exceeds the speed of the front drive train, upon which input torque is supplied to both the rear drive train and the front drive train until the speed of the rear drive train is approximately equal to the speed of the front drive train.

3. The on-demand four wheel drive system of claim 1, wherein the controller comprises a database that includes front and rear speed difference data and correlated steering angle data, and wherein the controller compares the difference in speed between the front and rear drive trains detected by the sensor system to the front and rear speed difference data to find the correlated steering angle in the database to thereby estimate the steering angle of the vehicle.

4. The on-demand four wheel drive system of claim 1, wherein the controller comprises a microprocessor that calculates the estimated steering angle based on a function correlating speed difference to steering angle.

5. The on-demand four wheel drive system of claim 1, wherein:
the front drive train comprises a front set of wheels, a front axle, and a front drive shaft, and wherein the sensor system detects the speed of the front drive train by detecting the speed of at least one of the front set of wheels, the front axle, and the front drive shaft; and
wherein the rear drive train comprises a rear set of wheels, a rear axle, and a rear drive shaft, and wherein the sensor system detects the speed of the rear drive train by detecting the speed of at least one of the rear set of wheels, the rear axle, and the rear drive shaft.

6. The on-demand four wheel drive system of claim 1, wherein the controller is operable to cause the transfer case to supply input torque to the front drive train and the rear drive train when the sensor system detects that the speed of the rear drive train exceeds the speed of the front drive train by approximately ten (10) to twenty (20) rotations per minute.

7. A vehicle comprising:
an engine operable to supply input torque;
a front drive train;
a rear drive train,
a sensor system operable to detect the speed of the front drive train and the speed of the rear drive train;
a transfer case that supplies the input torque to the front drive train and the mar drive train when the sensor system detects that the speed of the rear drive train exceeds the speed of the front drive train by a predetermined amount, the transfer case further operable to limit the amount of input torque supplied to the front drive train when the sensor system detects that the speed of the front drive train exceeds the speed of the rear drive train; and
a controller operable to estimate a steering angle of the vehicle based on a difference in speed between the front drive train and the rear drive train detected by the sensor system, and wherein the transfer case limits the amount of input torque supplied to the front drive train to a predetermined amount depending on the estimated steering angle.

8. The vehicle of claim 7, wherein the transfer case is further operable to supply substantially all input torque to the rear drive train until the sensor system detects that the speed of the rear drive train exceeds the speed of the front drive train, upon which input torque is supplied to both the rear drive train and the front drive train until the speed of the rear drive train is approximately equal to the speed of the front drive train.

9. The vehicle of claim 7, wherein the controller comprises a database that includes front and rear speed difference data and correlated steering angle data, and wherein the controller compares the difference in speed between the front and rear drive trains detected by the sensor system to the front and rear speed difference data to find the correlated steering angle in the database to thereby estimate the steering angle of the vehicle.

10. The vehicle of claim 7, wherein the controller comprises a microprocessor that calculates the estimated steering angle based on a function correlating speed difference to steering angle.

11. The vehicle of claim 7, wherein:
the front drive train comprises a front set of wheels, a front axle, and a front drive shaft, and wherein the sensor system detects the speed of the front drive train by detecting the speed of at least one of the front set of wheels, the front axle, and the front drive shaft; and
wherein the rear drive train comprises a rear set of wheels, a rear axle, and a rear drive shaft, and wherein the sensor system detects the speed of the rear drive train by detecting the speed of at least one of the rear set of wheels, the rear axle, and the rear drive shaft.

12. The vehicle of claim 7, wherein the transfer case supplies input torque to the front drive train and the rear drive train when the sensor system detects that the speed of the rear drive train exceeds the speed of the front drive train by approximately ten (10) to twenty (20) rotations per minute.

* * * * *